United States Patent [19]

Olson

[11] 3,709,522

[45] Jan. 9, 1973

[54] TOWBAR APPARATUS

[75] Inventor: David C. Olson, Burbank, Calif.

[73] Assignee: Lockheed Aircraft Corporation, Burbank, Calif.

[22] Filed: Aug. 27, 1971

[21] Appl. No.: 175,666

[52] U.S. Cl..................280/453, 180/14 C, 188/129, 280/475, 280/476, 280/507
[51] Int. Cl. .................................................B60d 3/00
[58] Field of Search.....280/453, 446, 449; 180/14 C; 188/129; 267/9 C, 10; 254/86 R

[56] References Cited

UNITED STATES PATENTS

| | | | |
|---|---|---|---|
| 2,541,356 | 2/1913 | Hansmann | 280/452 |
| 2,856,179 | 10/1914 | Hogan | 188/129 |
| 3,059,727 | 10/1923 | Fuchs | 188/129 |
| 3,300,233 | 1/1924 | Olson | 280/453 |

Primary Examiner—Leo Friaglia
Assistant Examiner—Vincent Hom
Attorney—Frank L. Zugelter et al.

[57] ABSTRACT

An apparatus for towing large vehicles, such as aircraft, and comprising an elongated braking drum, braking means offering frictional resistance to translation of and mounted about such drum and a recirculating ball bearing assembly disposed within and secured to the drum providing for the additional bearing surfaces required under an overload condition for or on the towed device. The assembly is mounted on a screw member fixed to the towing end of the apparatus. The drum is connected at its towed end to a radial-and-thrust bearing coupling while the braking means is supported and fixed at a given position by a tube connecting the apparatus at its towing end to a latching mechanism. An axial load applied through the apparatus is absorbed by the frictional resistance provided between the braking means and drum. When a predetermined frictional value is exceeded, the apparatus begins to telescope, by reason of the drum rotating upon the screw member. This may provide for a signal to the operator that an overload on the towed device has occurred. The overload energy of the apparatus, nevertheless, is absorbed by heat generated between the braking means and the drum as the latter rotates, without making inoperative or damaging the apparatus, or disconnecting it from the towed device. The towbar may then be reset for continued operation.

8 Claims, 5 Drawing Figures

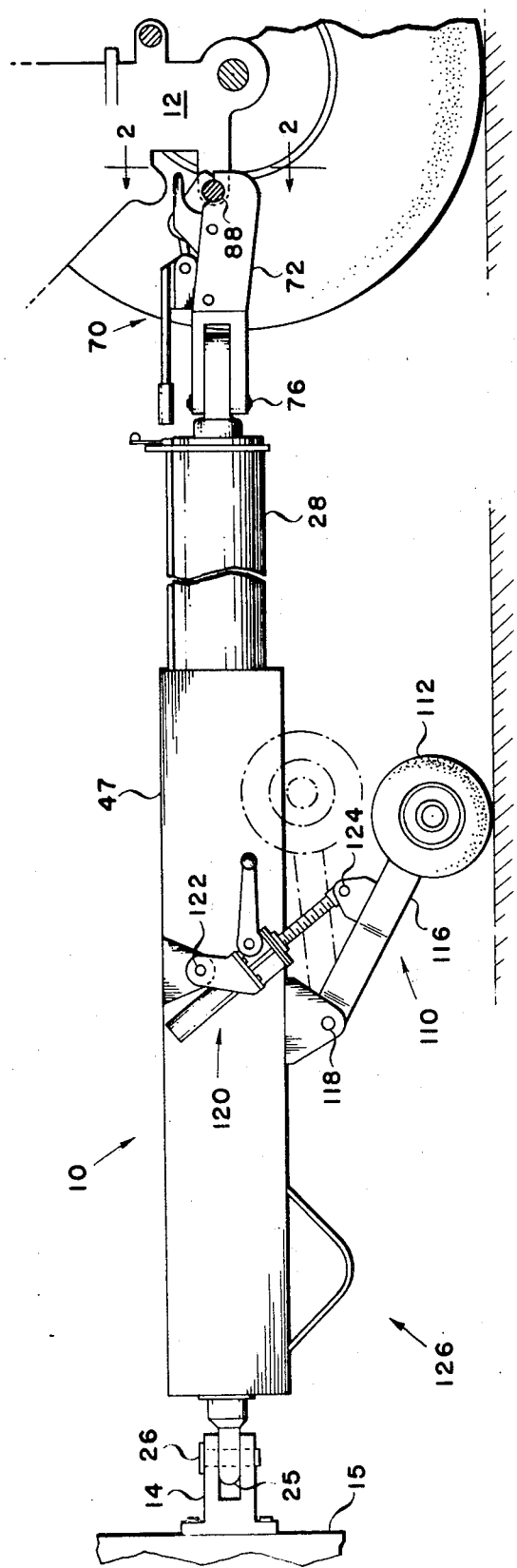
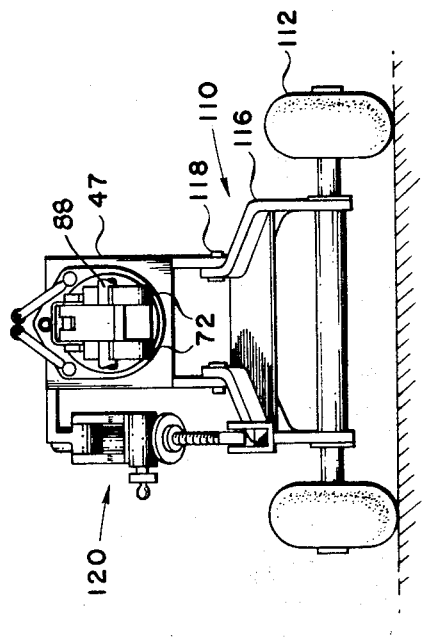
FIG. 1
FIG. 2
INVENTOR.
DAVID C. OLSON

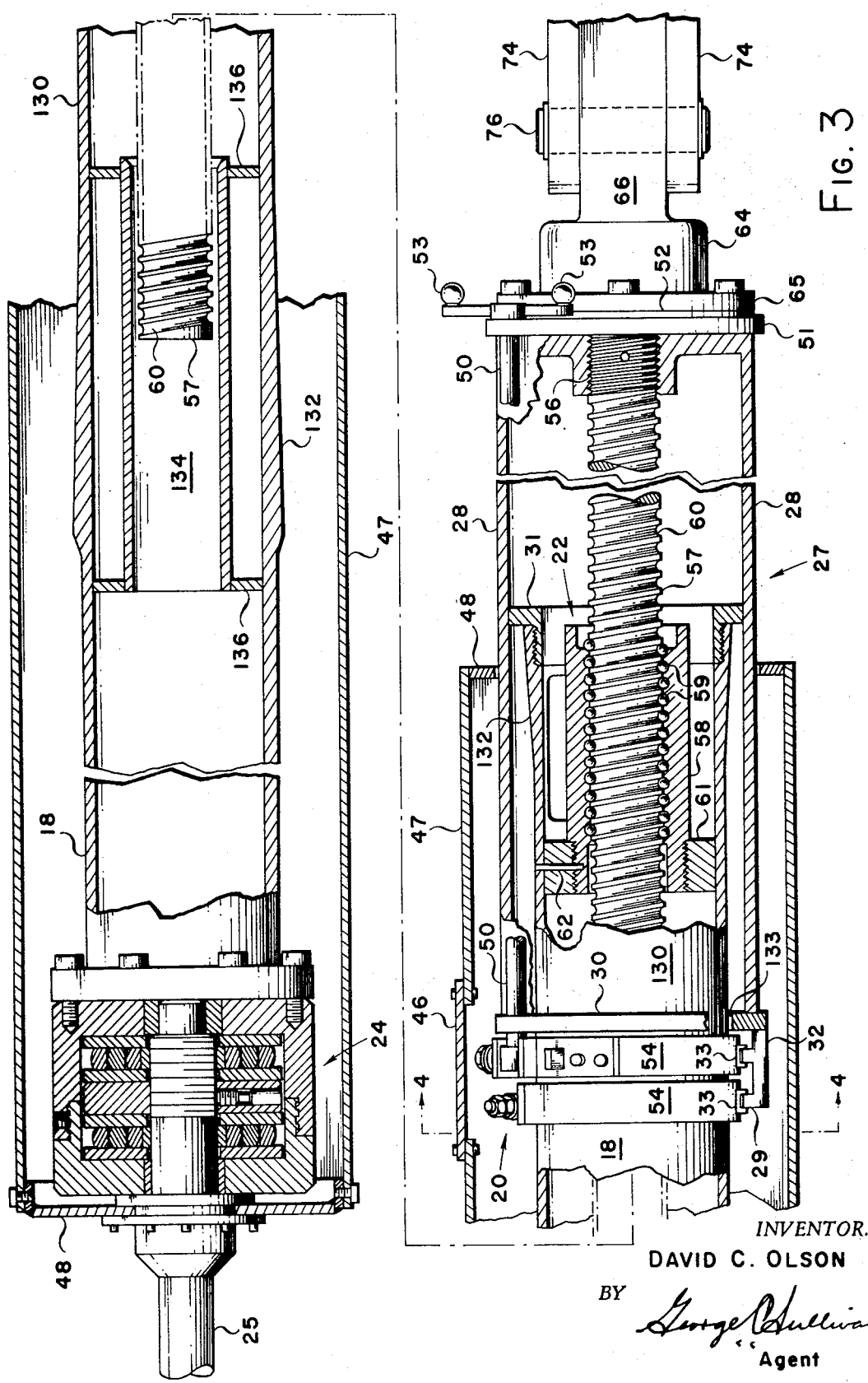

TOWBAR APPARATUS

BACKGROUND OF THE INVENTION

1. Field of the Invention

The field of art to which the invention is most likely to pertain is located in a class of devices generally relating to towing devices. Classes 92, Expansible Chamber Devices; 188, Brakes; 192, Clutches and Power-Stop Control; and 280, Land Vehicles, U.S. Patent Office Classifications, may be the applicable general areas of art in which the claimed subject matter of the type involved here may be classified.

2. Description of the Prior Art

An example of a prior art device in the art or arts to which this invention most likely pertains is U.S. Pat. No. 2,541,356.

PROBLEMS IN THE PRIOR ART AND INDUSTRY

Movement of huge jet aircraft demands considerable efforts of man and machine, and such efforts have been found to include the necessity of coordination for such movement between the vehicle's pilot and ground personnel together with use of prime movers, towbars and other equipment for safely rolling such vehicles from and into one position to or from another.

The advent of huge aircraft has also created problems concerning their movement about and around cargo and passenger terminals; i.e., in areas where very slow movement is required and other than in the taxiing and flying runways. Initially, the aircraft must overcome its own inertia by considerable power. One known method to do this is by revving up its engines. However, fuel economy is not realized, also, danger exists to the welfare of ground personnel and others in the area from the engine blasts and turning movements of the aircraft. Further, limited vision through the cockpit window by a pilot clearly exemplifies the fact that maneuverability with complete visual observation of all features of the plane is impossible.

Consequently, equipment such as prime movers and towbars have been utilized for some time now, to move such aircraft in an easy, safe and handily manner, with the results of aircraft fuel economy and safety and health of persons in the immediate vicinity of the moving aircraft.

Large or heavy aircraft now in existence and still being developed require not only a prime mover and towbar arrangement, but also a moving system which includes load limiting protection to the vehicle or to landing gear to which the towbar is latched. In other words, without some check on how much load the vehicle or landing gear can take, its connected towing device could severely damage the vehicle and such landing gear by pulling such vehicle or gear, or such accessory thereto, beyond its elastic load limits. In the past, shear pins or solid constructions in towbars have been utilized in a purposeful manner to fail, rather than have damage result to a landing gear and towed plane themselves. However, various problems resulted in broken towbars and additional time for moving a jet aircraft accompanied such a use.

SUMMARY OF THE INVENTION

An object of this invention, then, is to provide a towing system including load limiting features which may signal an operator that an overload has been imposed upon a landing gear.

Another object of this invention is to provide a selected load for a towbar apparatus which is safely below the design limits of an aircraft landing gear or other device to-be-towed, whereby the apparatus need not be disconnected from the towed device, or made inoperative or damaged otherwise, but only stopped and reset upon the occurrence of such an overload.

Another object of the invention is the provision of a variable load limiting capacity in a towbar apparatus.

A further object of this invention is the provision of an energy-absorption feature in a towbar and which otherwise would be required to be placed directly into a vehicle or landing gear.

Other objects of this invention are to provide a novel towing apparatus and an improvement therein.

These and other objects and inventions will become apparent upon a full reading of the following description, appended claims thereto, and the accompanying drawing.

BRIEF DESCRIPTION OF THE DRAWING

FIG. 1 is a side elevational view of an embodiment of my invention in an actual position for towing.

FIG. 2 is a view taken on line 2—2 of FIG. 1.

FIG. 3 is a view, partly in section and partly broken away, of a portion of the embodied towbar shown in FIG. 1.

DESCRIPTION OF THE PREFERRED EMBODIMENT

Figure 5:
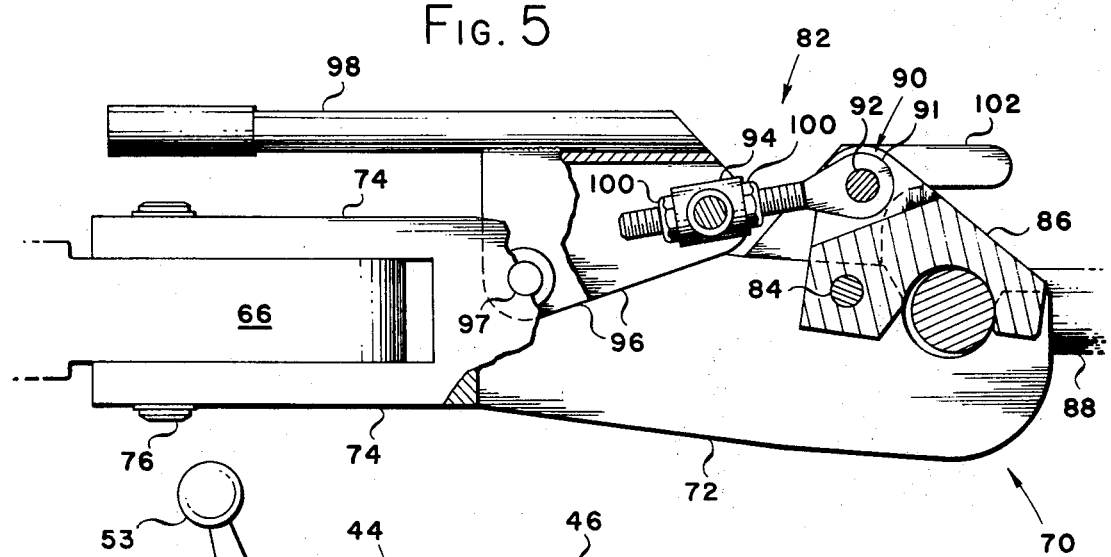
FIG. 5 is a fragmentary view, partly in section and partly broken away, of the latching end for the towbar embodiment shown in FIG. 1.

Referring now to the drawing in which reference characters correspond to like numerals in the following description, reference character 10 refers in general to a towbar apparatus embodying my invention. Towbar 10 is illustrated in FIG. 1 to be in an exemplary position for use, say, between a frontal landing gear 12 of a huge or very heavy jet aircraft (not shown) and a strong bifurcated member 14 securely mounted on a prime mover or vehicle 15 for moving such a heavy vehicle.

Towbar 10 comprises an elongated brake drum 18 (FIG. 3) about which one or more braking means 20 offering frictional resistance to rotation thereof is mounted for cooperative action therewith, a recirculating ball bearing assembly 22 disposed within and secured to drum 18, and a conventional housed thrust-and-radial bearing coupling 24 secured to the one end of drum 18. Coupling 24 transmits loads through itself and provides rotational ability for the drum 18. Coupling 24 is suitably connected to a means 25, such as a lunette eye, provided for connecting the one end of towbar 10 to bifurcated member 14 by means of a pin 26. A means 27, such as a tube 28 and a finger means 29 longitudinally secured to one end of tube 28, is provided for maintaining the braking means 20 at a given point along the length of towbar 10. In this instance, such length may be measured from the end of towbar 10 opposing its end at which coupling 24 is located. Tube 28 circumscribes the indicated length along and is spacedly mounted about drum 18. An annular flange 30 suitably mounted on and suitably secured to the interior end of tube 28 is centered about drum 18 by means of its connection to braking means 20 through finger means 29. A collar spacer 31 is threaded to the other end of drum 18 and slip-fittedly engages the interior wall of tube 28. Annular flange 30 preferably terminates immediately adjacent the braking means 20, and which means 20 is shown in FIG. 3 to be in a nominal position for towbar 10.

Figure 4:
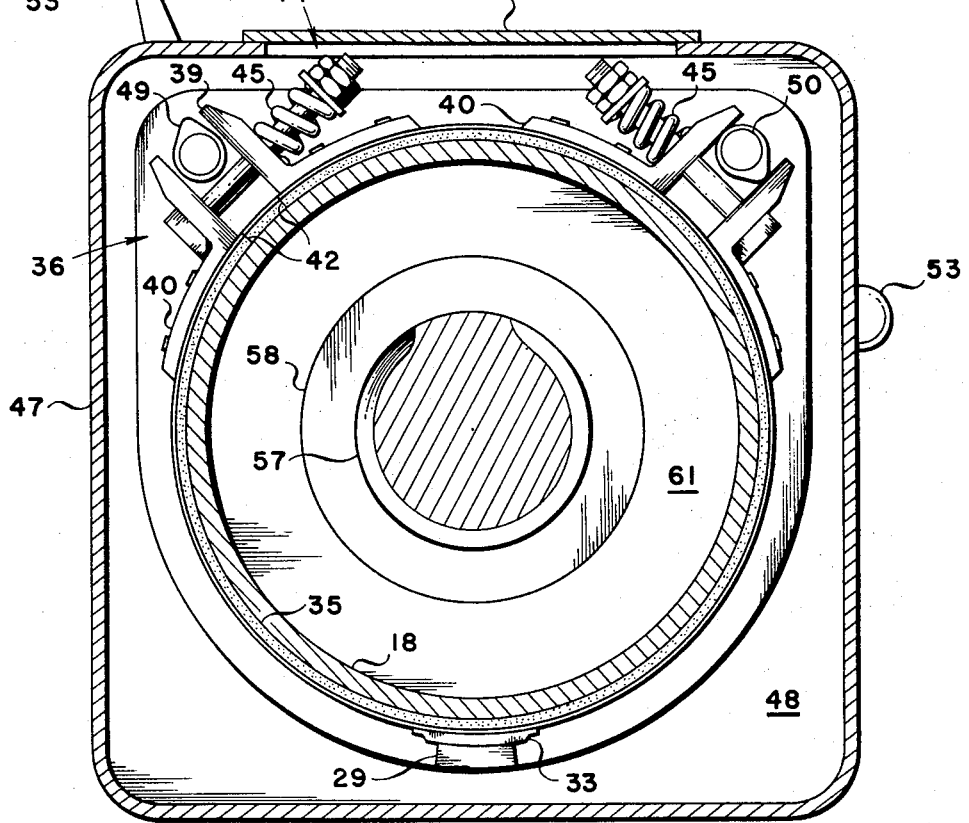
FIG. 4 is a view taken on line 4—4 of FIG. 3.

The nominal position (FIG. 3) for towbar 10 may be defined as the relative positions of the drum 18 and braking means 20 prior to application to towbar 10 of a predetermined load value at which drum 18 would begin to rotate and to axially translate or move against the frictional resistance provided by braking means 20. Means 20 is conveniently held at its nominal position on brake drum 18 by means of one or more of the finger means 29 mounted on a longitudinally extending bracket 32 suitably secured to flange 30 as shown in FIG. 4. Spaced lugs 33 are suitably provided on the periphery of each braking means 20 and by which a finger of means 29 captures means 20. The lugs 33 are configurated and arranged in relation to drum 18 such that braking means 20 cannot rotate about it.

Each braking means 20 comprises (FIG. 4) a frictional lining 35 banded about brake drum 18 and held thereabouts by means of an adjustable tension means 36 which produces such predetermined load value by providing a desired degree of frictional engagement between lining 35 and drum 18. Tension means 36 comprises a pair of spaced bracket members each having an upright portion 39 and a portion 40 secured, such as by rivets, to lining 35 adjacent its ends 42, and a biasing bolt-and-nut arrangement 44 capable of drawing together the upright portions 39. Adjustment by which the desired degree of frictional engagement is obtained is provided for by a spring 45 coiled about the bolt between one upright portion 39 and its nut, whereby adjustment of the nut position on the bolt adjusts the tension in the lining 35 and, consequently, the degree of such frictional engagement. Access for such adjustment is made convenient through a door 46 provided in a protective housing 47 suitably mounted about coupling 24 and extending to and circumscribing a suitable length of tube 28. Plate covers 48 ensure total easement of coupling 28 and braking means 20.

Release of lining 35 from drum 18 is provided by a rotatable cam head 49 disposed between the spaced upright portions 39. Rotation of cam head 49 into engagement with the one portion 39 causes the latter to react against spring 45 and thus provide for such release. An operating shaft 50 is provided for cam head 49 and is conveniently supported in flange 30 and in a flat bracket member 51 circularly mounted adjacent the outer end 52 of tube 28, and through which member 51 outer end 52 projects. A suitable hand crank 53 is attached to such end of shaft 50 for ease of releasing and engaging braking means 20 about drum 18.

It may be noted from FIGS. 3 and 4 that a second braking mechanism 54 and its attendant features such as described immediately above are included in the preferred embodiment. By this additional mechanism 54, towbar 10 is applicable throughout a greater range of loads, and thus to larger sized of vehicles (aircraft, by way of example), than were merely one braking means 20 included in towbar 10. In effect then, two or more braking mechanisms 20, 54, etc., provide a towbar device 10 with the capability of moving vehicles having a very wide variety of mass. For the greater loads, more than one braking means 20, 54, etc., would be engaged by rotating their respective cam heads 49 out of contact with their respective uprights 39. A corresponding plurality of finger means 29, of course, would then also be utilized.

At the end 52 of support tube 28, a means 56, such as suitable threading and pinning elements, is provided for securing the one end of a screw member 57 forming a portion of assembly 22, and thereby eliminate rotational movement for screw member 57 relative to support tube 28. A mating nut 58 for and mounted on screw member 57 provides for retention of a plurality of complement of freely movable bearing balls 59 in helical races 60 formed in screw member 57 and its mating nut 58. An annular ring nut 61 is threadedly mounted to the one end of mating nut 58 and means such as a pin 62 secures assembly 22 to drum 18.

Assembly 22 and screw member 57 together is a commercially available item. An example thereof, one which is satisfactory for the operation of towbar 10, is what is known in the trade as a recirculating ball screw jack, or Saginaw bearing ball (b/b) screw made and sold by the Saginaw Stearing Gear Division, General Motors Corporation, Saginaw, Mich. It should be noted that FIG. 3 does not disclose certain details of such a Saginaw b/b screw with regard to the recirculation of the bearing balls 59; however, such details are well known in the trade as same is part and parcel of such a commercial product. Such recirculation provides for the continual bearing between screw member 57 and drum 18 required in the operation of towbar 10, particularly in regard to the relative extension and retraction of drum 18 to tube 28.

The end 52 of tube 28 supports a solid body 64 having a flange 65 secured to end 52 and an extension 66 adapted to connect to and support a latching mechanism 70 for towbar 10. Latching mechanism 70 (FIGS. 1 and 5) is provided for connecting landing gear 12 to towbar 10. It should be understood that mechanism 70 is not part of the essence of the invention, and is illustrated merely for the purpose of assisting understanding of this disclosure, by showing in one instance how towing device 10 is capable of actually being used. In this instance, as applied to an aircraft landing gear. Other latching mechanisms and fields of use for apparatus 10 are equally available for use with my invention.

Latch mechanism 70 (FIGS. 1, 2, 5) comprises a pair of vertically disposed bifurcated jaws 72 extending forwardly from a pair of horizontally disposed bifurcated arms 74, and are suitably secured, such as by welding, to the latter. Arms 74 are pinned as at 76 to the solid extension 66 of solid body 64. A latching means 82 is pivotally connected as at 84 to and is disposed between bifurcated jaws 72 and comprises a hand 86 closable upon a tow-pin 88 of the landing gear 12 (FIGS. 1 and 5). Hand 86 includes a bifurcation into which an adjustable threaded rod 90, having an eyelet 91 at its one end, is introduced and pivotally connected to hand 86 by means of a cross-rod 92. The other end of rod 90 passes through a bar 94 suitably held in place between a pair of spaced bracket members 96 pivoted to jaws 72, as at 97, and to which a handle 98 is attached. The length of rod 90 is adjustable at bar 94 by hex nuts 100 mounted to each side of bar 94. As handle 98 is rotated clockwise fashion, the action of rod 90 pivots hand 86 into an open position for introduction or removal of tow-pin 88. Counter-clockwise rotation of handle 98 provides action for rod 90 such that hand 86 clamps upon tow-pin 88.

It may be noted that the adjustability of the longitudinal position for eyelet 91, provided by adjustment of rod 90 at bar 94, provides suitable clamping upon various sized tow-pins 88 or other element upon which latching means 70 may easily seize.

A pair of spaced fingers 102 projecting forwardly and overly of jaws 72, and to each side of latch hand 86, is suitably secured to such bifurcated jaws 72, for resting upon a tow-pin 88 or the like in the event that a wheeling apparatus 110 (FIGS. 1, 2) is in a raised position and hand 86 is in an open position, in order to prevent dropping of the one end of towbar apparatus 10 with its other end is hooked to the prime mover 15.

Towbar 10 is provided with a wheeling apparatus 110 by which it is transportable along the ground, either by prime mover 15 or by manual manipulation, prior to connecting it to, say, landing gear 12. Wheeling apparatus 110 comprises a conventional tire-and-axle combination 112 and an undercarriage frame 116 suitably mounted thereto, all of which may be fabricated in a conventional manner. Frame 116 is pivotally connected, as at 118, to housing 47. A conventional mechanical jacking device 120 (FIG. 1) is pivotally connected to both housing 47 and frame 116, as at 122, 124, respectively, for raising wheeling apparatus 110 up off of ground surface after towbar 10 has been positioned, as shown in phantom in FIG. 1, and during towing of tow-pin 88 and its vehicle. For stationarily positioning towbar 10, a suitable skid arrangement 126 may be provided.

In operation, apparatus 10, held in its nominal position by means of at least one of the braking means 20, 54 engaging drum 18, and with its wheeling apparatus 110 in down or rolling position, is rolled to and connected to tow-pin 88. Thereafter, the jacking device 120 is operated to raise the other end of apparatus 10 to a level at which lunette eye 25 is connected to prime mover 15. Thereafter, mechanical jack 120 is operated to raise wheeling apparatus 110 out of ground surface contact. Apparatus 10 is now supported solely by prime mover 15 and landing gear tow-pin 88, and prime mover 15 is in position to pull or push the vehicle on which tow-pin 38 is mounted by means of tow-bar 10.

One or more of the braking means 20, 54 has been applied to brake drum 18 by actuation of its or their corresponding cam means 49 through the operating shaft 50 and hand crank 53. Prime mover 15 begins to pull or push. Under axial load conditions, up to a predetermined value, the frictional application of brake means 20 and/or 54 to brake drum 18 prevents rotational movement of drum 18 relative to tube 28, as such axial load is transmitted from the landing gear 12 through tube 28, braking means 20, drum 18, coupling means 24, and finally to prime mover 15. Should the pre-set frictional value of such axial load be exceeded, then drum 18 begins to rotate and axially translate or move against the grip of braking means 20 and/or 54, as prime mover 15 pulls or pushes towbar 10.

As an axial load is initially applied, the load at the one end of towbar 10 is carried from the lunette eye 25 through coupling 24, drum 18, and then to the recirculating ball bearing assembly 22. A reaction to such load is developed in or by screw 57 connected through fixed end 52 to the solid body 64, its extension 66 and latching means 70. As the load value increases to over its predetermined frictional value, the mating nut 58 tends to rotate, drum 18 rotating with it. In other words, the turning moment on drum 18 overcomes the frictional resistance provided by braking means 20. Drum 18 and mating nut 58 move to the left in FIG. 3 as prime mover 15 pulls, and they move to the right as prime mover 15 pushes, while bearing balls 59 correspondingly recirculate to active raceways along the length of assembly 22 to maintain the continual bearing required for towbar 10 to undertake such an excessive load. In other words, drum 18 is capable of rotating in relation to screw 57 because of the radial bearing function of coupling 24. As lunette eye 25 is connected to prime mover 15 and carries its load into drum 18 through coupling 24, it remains in a static condition even through drum 18 may rotate.

In order to control the load at which drum 18 begins to rotate, and move from its nominal position, braking means 20 and/or 54 bear frictionally upon it. These braking means are, of course, individually adjustable to vary the load limiting point or value at which drum 18 begins to rotate. The constant friction occuring therebetween after the load limiting point has been exceeded provides a constant load resistance, as drum 18 is pushed or pulled while it resistingly rotates and slides through the braking means 20 and along a ground surface 130 (FIG. 3) of constant diameter of drum 18.

Should the relative travel between drum 18 and braking means 20 exceed the distance provided along the constant diameter of ground surface 130 on drum 18, so that means 20 reaches an unground or divergingly tapered surface 132 provided on each end of drum 18, such friction then increases, and rises on a graduated scale depending on the degree of the diverging taper between the ground to unground surfaces. The load limit for towbar 10, therefore, is increased by such taper. These tapers 132 also constitute means for stopping rotation of drum 18 before mating nut 58 disengages from screw 57 in the one instance of prime mover 15 pulling towbar 10, or before the collar spacer 31 contacts the fitting or means 56 in the other extreme instance in which a prime mover 15 is pushing a towbar against tow-pin 88. A suitably-sized opening 133 is provided in annular flange 30 for passage of the tapered surfaces 132 adjacent the collar spacer 31 in the event of an extreme telescoping of tube 28 relative to drum 18.

An auxiliary tube 134, with suitable mounting flanges 136, may be suitably fixed to and confined within drum 18 to provide for additional central alignment and support for screw 57. This also assists in maintaining a proper spacing for tube 28 about drum 18, as alignment of screw 57 carries with it a centering for tube 28 to which it is attached at its end 52.

It should now be apparent that assembly 22 and coupling 24 provide rotational capability to drum 18, while assembly 22, drum 18 and braking means 20 absorb an axial load between the prime mover 15 and the vehicle.

To return or retract towbar 10 to its nominal position after a telescoping extension between drum 18 and tube 28 has occured, all braking means 20, 54, etc., are first released from their frictional engagement with drum 18. Then, say, with the use of a prime mover 15, and while latching mechanism 70 is still clamped to a tow-pin 88 of an aircraft which is stationarily held, housing 47 is telescoped upon tube 28. Drum 18 readily rotates about assembly 22. Upon reaching nominal position, one or more of the braking means 20 may then be re-engaged. A suitable marking or other device may be mounted on the exterior of towbar 10 to inform the operator what the relative positions of tube 28 and housing 47 are, in the nominal position for towbar 10.

Visual means, not a part of this invention, may be added to the exterior of apparatus 10 in a suitable manner in order to inform the operator that it is no longer in its nominal position.

It should now be apparent that the telescoping effect of towbar 10, in either extending or retracting mode, as it undertakes loads exceeding a predetermined frictional value, may provide a signal to the operator that an overload condition exists relative to the towbar. The significance of this is not so much directed to maintaining an operational condition for towbar 10 itself as it is in relation to the strength of a vehicle landing gear. In other words, all loads undertaken by towbar 10 can be correlated to a known strength of a vehicle or a tow-pin in a landing gear during the design stages of the particular vehicle or aircraft involved.

It should also be apparent that the overload energy of towbar 10 is absorbed by heat generated between the braking means and the drum as the latter rotates.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. In an apparatus for towing and having first and second ends, the improvement comprising,
   1. an elongated drum member,
   2. braking means offering frictional resistance to and mounted about said drum member,
   3. means for supporting said braking means about said drum and being secured to the first end of said apparatus,
   4. a radial-and-thrust bearing coupling disposed at and secured to the second end of said apparatus, said drum being operatively connected thereto,
   5. a recirculating ball bearing assembly disposed within and secured to said drum,
   6. a screw member being fixed to the first end of said apparatus, said assembly and drum being capable of rotating and translating thereon, and
   7. means for frictionally engaging and releasing said braking means to and from said drum, whereby as an axial load is imposed on said apparatus, it is transmitted to said braking means, drum and assembly, the energy of any load thereon in recess of a predetermined frictional value, at which value said assembly and drum rotate and translate one said screw member, being absorbed by heat generated between said braking means and drum as the apparatus telescopes, without separation of or damage or inoperativeness to said apparatus occuring.

2. In the apparatus of claim 1, the addition of means for adjusting the tension of said braking means about said drum.

3. In the apparatus of claim 2 including means for stopping rotation of said drum after said apparatus has telescoped.

4. In the apparatus of claim 3, said stopping means comprising at least one diverging tapered surface mounted on said drum, said diverging tapered surface cooperating with said braking means to stop rotation of said drum.

5. An apparatus for towing comprising in combination,
   1. two ends for said apparatus,
   2. an elongated drum member,
   3. braking means offering frictional resistance to and mounted about said drum member,
   4. means for supporting said braking means about said drum and being secured to one of such ends of said apparatus,
   5. a radial-and-thrust bearing coupling disposed at and secured to the other of such ends of said apparatus, said drum being operatively connected thereto,
   6. a recirculating ball bearing assembly disposed within and secured to said drum,
   7. a screw member being fixed to one of such ends of said apparatus, said assembly and drum being capable of rotating and translating thereon, and
   8. means for frictionally engaging and releasing said braking means to and from said drum, whereby as an axial load is imposed on said apparatus, it is transmitted to said braking means, drum and assembly, the energy of any load thereon in excess of a predetermined frictional value, at which value said assembly and drum rotate and translate on said screw member, being absorbed by heat generated between said braking means and drum as the apparatus telescopes, without separation of or damage or inoperativeness to said apparatus occuring.

6. The apparatus of claim 5 including means for adjusting the tension of said braking means about said drum.

7. The apparatus of claim 6 including means for stopping rotation of said drum after said apparatus has telescoped.

8. The apparatus of claim 7 in which said stopping means comprises at least one diverging tapered surface mounted on said drum, said diverging tapered surface cooperating with said braking means to stop rotation of said drum.

* * * * *

UNITED STATES PATENT OFFICE
CERTIFICATE OF CORRECTION

Patent No. 3,709,522     Dated January 9, 1973

Inventor(s) DAVID C. OLSON

It is certified that error appears in the above-identified patent and that said Letters Patent are hereby corrected as shown below:

In column 8, line 8, "recess" should read ---excess----.

In column 8, line 10, "one" should read ---on----.

Signed and sealed this 29th day of May 1973.

(SEAL)
Attest:

EDWARD M. FLETCHER, JR.          ROBERT GOTTSCHALK
Attesting Officer                Commissioner of Patents